(12) United States Patent
Malviya et al.

(10) Patent No.: US 12,736,743 B2
(45) Date of Patent: Sep. 15, 2026

(54) SINGLE MODE OPTICAL FIBER SUITABLE FOR RIBBON APPLICATIONS

(71) Applicant: Sterlite Technologies Limited, Haryana (IN)

(72) Inventors: Apeksha Malviya, Haryana (IN); Priya Gupta, Haryana (IN); Srinivas Reddy, Haryana (IN); Anand Pandey, Haryana (IN)

(*) Notice: Subject to any disclaimer, the term of this patent is extended or adjusted under 35 U.S.C. 154(b) by 80 days.

(21) Appl. No.: 18/177,061

(22) Filed: Mar. 1, 2023

(65) Prior Publication Data

US 2023/0314698 A1 Oct. 5, 2023

(51) Int. Cl.
*G02B 6/02* (2006.01)
*G02B 6/028* (2006.01)
*G02B 6/036* (2006.01)
*G02B 6/44* (2006.01)

(52) U.S. Cl.
CPC ..... *G02B 6/03627* (2013.01); *G02B 6/02004* (2013.01); *G02B 6/0281* (2013.01); *G02B 6/4403* (2013.01)

(58) Field of Classification Search
CPC .............. G02B 6/02004; G02B 6/0281; G02B 6/03627; G02B 6/4403
See application file for complete search history.

(56) References Cited

U.S. PATENT DOCUMENTS

| | | | | |
|---|---|---|---|---|
| 8,031,997 B2 * | 10/2011 | Overton | ............. | G02B 6/02395 385/112 |
| 10,422,949 B2 * | 9/2019 | Maruyama | ........... | G02B 6/0281 |

* cited by examiner

*Primary Examiner* — Ryan A Lepisto
(74) *Attorney, Agent, or Firm* — Steven R. Fairchild

(57) ABSTRACT

The present invention relates to an optical fiber (100) comprising a core region (102) having radius R1 and a cladding region (104) having a radius R3. In particular, the core region (102) is defined along a central longitudinal axis (110) and the cladding region (104) is defined along the central longitudinal axis (110) of the optical fiber (100). Moreover, the optical fiber (100) has a Mode Field Diameter in a range of 8.5+/−0.3 microns at a wavelength of 1310 nanometers, a micro-bending loss of less than equal to 0.5 dB/Km at a wavelength of 1550 nanometers, macro-bending loss of less than 1 dB/Km at a wavelength 1550 nanometers. Further, the optical fiber (100) has a diameter of less than 210 microns.

18 Claims, 3 Drawing Sheets

100

SINGLE MODE OPTICAL FIBER SUITABLE FOR RIBBON APPLICATIONS

CROSS-REFERENCE TO RELATED APPLICATIONS

This application claims the benefit of Indian Application No. 202211019714, titled "SINGLE MODE OPTICAL FIBER SUITABLE FOR RIBBON" filed by the applicant on Mar. 31, 2022, which is incorporated herein by reference in its entirety

FIELD OF THE INVENTION

Embodiments of the present invention relate to the field of optical fibers and more particularly, relate to a single mode optical fiber for use in Intermittently Bonded Ribbon cables.

DESCRIPTION OF THE RELATED ART

Being a critical component of a modern communication network across the globe, optical fiber cables are widely used for communication to meet the increasing demands. Optical fiber cables utilize optical fibers to transmit signals such as voice, video, image, data or information. Optical fibers are strands of glass fiber processed so that light beams transmitted through the glass fiber are subject to total internal reflection wherein a large fraction of the incident intensity of light directed into the fiber is received at the other end of the fiber.

Advancements in science and technology has led to the updation of classic optical fiber cable technologies with new technologies. Today, optical fibers can be bonded intermittently along a longitudinal length to form an intermittent bonded ribbon unlike a conventional optical fiber ribbon. The intermittently bonded ribbon (IBR) consists of fibers bonded using matrix material at intermittent or irregular intervals. IBRs are being used in optical fiber cables known as an intermittently bonded ribbon cable. The IBR cables require stringent micro bend performance of the optical fibre due to its complex design.

In order to draw an optical fiber from the optical fiber cable out and lead the optical fiber into a house of a user, it is necessary to perform an intermediate branching of the optical fiber cable, taking out a desired ribbon, and separating and taking out a single coated optical fiber from the ribbon.

One of the key characteristics required to be maintained or controlled is a Mode Field Diameter. It is essential for the Mode Field Diameter of the optical fiber to be low in combination with an immediate trench around the core for facilitating the optical fiber and the optical fiber cable to provide expected performance. The optical fiber with this combination helps in making the complex Intermittently Bonded Ribbon like cables with good performance. However, the optical fibers used in the conventional intermittently bonded ribbon cables do not have desired values of micro-bending loss, macro-bending loss and Mode Field Diameter. Currently, a few patent applications provide an enhanced intermittently bonded ribbon.

Australian patent application no. AU2001292225A1 titled 'Optical fibre for to-the-home distribution network" provides an optical fiber with macro-bending losses at 1550 nanometers that are less than about 0.5 dB/m and micro-bending losses at 1550 nanometers that are less than 15 about 15 (dB/km)/(g/mm).

Canadian patent application no. CA2382957A1 titled "Higher wavelength optimized optical fiber waveguide" discloses a single mode optical fiber exhibiting micro-bending loss of less than 0.7 dB/m and a macro-bending loss of less than 11 dB/m at 1700 nanometers.

Netherlands patent no. NL2019817B1 titled "Low bend loss optical fiber with a chlorine doped core and offset trench" discloses an optical fiber having wire mesh covered drum with micro-bending loss of less than 0.1 dB/km and a Mode Field Diameter greater or equal to 9 microns at 1310 nanometers.

Indian patent application no. IN-MUM-200500929A discloses an optical fiber with a Mode Field Diameter of about 8.3+0.6 μm with macro-bending loss of less than 0.05 dB at 1550 nanometers and micro-bending loss of less than 0.5 dB at 1550 nanometers.

However, there are a number of drawbacks in the current technologies providing intermittently bonded ribbon. The optical fiber disclosed in the prior arts is a dispersion shifted fiber and values of macro-bending loss at 15 mm diameter are not provided. Moreover, none of the prior arts provide mandrel diameter of the optical fiber along with the macro-bending loss values. Furthermore, the optical fibers of the prior arts are dispersion shifted fibers and have a different refractive index profile. Accordingly, to overcome the disadvantages of the prior arts, there is a need for a technical solution that overcomes the above-stated limitations in the prior arts. The present invention provides an optical fiber with modified design and optimized characteristics for intermittently bonded ribbon cables with desired performance characteristics.

SUMMARY OF THE INVENTION

Embodiments of the present invention relate to an optical fiber comprising a core region and a cladding region having a radius R3. In particular, the core region has a radius R1. Moreover, the core region is defined along a central longitudinal axis of the optical fiber. Furthermore, the cladding region is defined along the central longitudinal axis of the optical fiber. Further, the optical fiber has a Mode Field Diameter in a range of 8.5+/−0.3 microns at a wavelength of 1310 nanometers, a micro-bending loss of less than equal to 0.5 dB/Km at a wavelength of 1550 nanometers and a macro-bending loss of less than 1 dB/Km at a wavelength 1550 nanometers.

In accordance with an embodiment of the present invention, the cladding region further comprises an inner clad region defined by an inner clad refractive index profile and an outer clad region surrounding the inner clad region. In particular, the outer clad region is defined by an outer clad refractive index profile. Moreover, the inner clad refractive index profile is different from the outer clad refractive index profile.

In accordance with an embodiment of the present invention, the inner clad region is down-doped silica region adjacent to the core region such that there is no buffer region between the core region and the inner clad region.

In accordance with an embodiment of the present invention, the inner clad region is a trench region defined by one or more of trench delta in a range of −0.05 to −0.2, a trench radius R2 between 14 microns to 16.5 microns and trench alpha between 6 and 9.

In accordance with an embodiment of the present invention, the core region is defined by a core alpha. In particular, the core alpha of the core region is less than the trench alpha of the trench region.

In accordance with an embodiment of the present invention, the outer clad region (108) is un-doped silica region.

In accordance with an embodiment of the present invention, the core region is up-doped silica region.

In accordance with an embodiment of the present invention, the optical fiber is defined by a refractive index dip, and the refractive index dip is a difference between maximum refractive index and minimum refractive index.

In accordance with an embodiment of the present invention, an absolute value of the difference between the maximum refractive index and the minimum refractive index is between 0.005 to 0.009.

In accordance with an embodiment of the present invention, the optical fiber is defined by a delta ratio, and the delta ratio is a ratio of absolute values of a trench delta of a trench region to absolute values of a core delta of the core region.

In accordance with an embodiment of the present invention, the delta ratio is between 0.12 to 0.67.

In accordance with an embodiment of the present invention, the optical fiber has a diameter of less than 210 microns.

In accordance with an embodiment of the present invention, the optical fiber is used in a cable such that a cable filling coefficient is in a range of 25-40% when the optical fiber has a diameter in a range of 250+-15 microns, In accordance with an embodiment of the present invention, the cable filling coefficient is in a range of 35-55% when the optical fiber has a diameter in a range of 200+-15 microns.

In accordance with an embodiment of the present invention, the cable filling coefficient is greater than 50% when the optical fiber has a diameter of less than 185 microns.

In accordance with an embodiment of the present invention, the cable filling coefficient is defined as total cross-sectional area of fiber divided by an inner cross section area of the cable. In particular, the inner cross section area of the cable is defined by an outermost sheath of the cable.

In accordance with an embodiment of the present invention, the optical fiber is manufactured using any of an Outside Vapor Phase Oxidation (OVPO) method, a Modified Chemical Vapor Deposition (MCVD) method, a Vapor-phase Axial Deposition (VAD) method and the like.

In accordance with an embodiment of the present invention, the radius R1 of the core region is in a range of 4.5 microns to 5.6 microns.

In accordance with an embodiment of the present invention, the core region has a curve parameter core alpha in a range of 2.5 to 5.0

In accordance with an embodiment of the present invention, the outer clad region has radius R3 in a range of 62 microns to 63 microns.

The foregoing objectives of the present invention are attained by providing a single mode optical fiber for use in Intermittently Bonded Ribbon cables.

BRIEF DESCRIPTION OF THE DRAWINGS

So that the manner in which the above-recited features of the present invention are understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

ELEMENT LIST

Optical fiber—100
Core region—102
Cladding region—104
Inner clad region—106
Outer clad region—108
Central longitudinal axis—110
Refractive index profile—200
Cable—300
Plurality of optical fiber bundles—302
Sheath—304

The optical fiber is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE INVENTION

Figure 1:
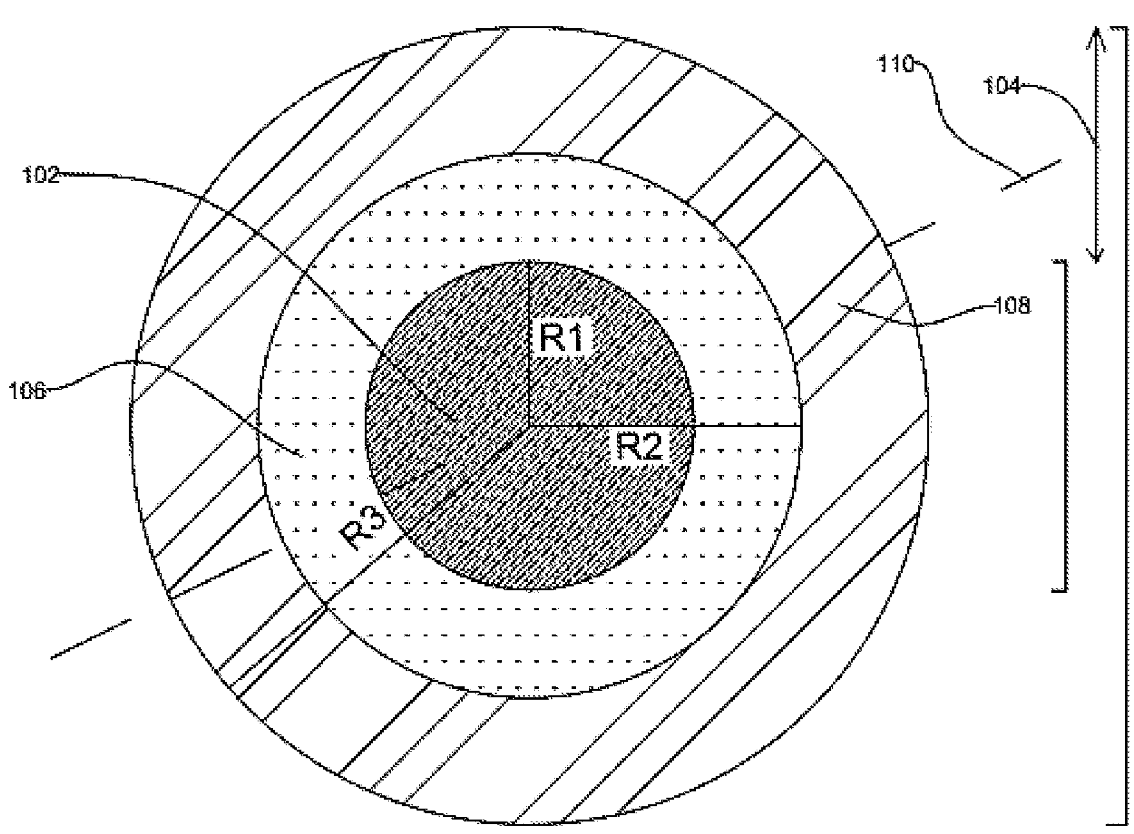
FIG. 1 is a snapshot illustrating a cross-sectional view illustrating an optical fiber in accordance with one embodiment of the present invention.
Figure 2:
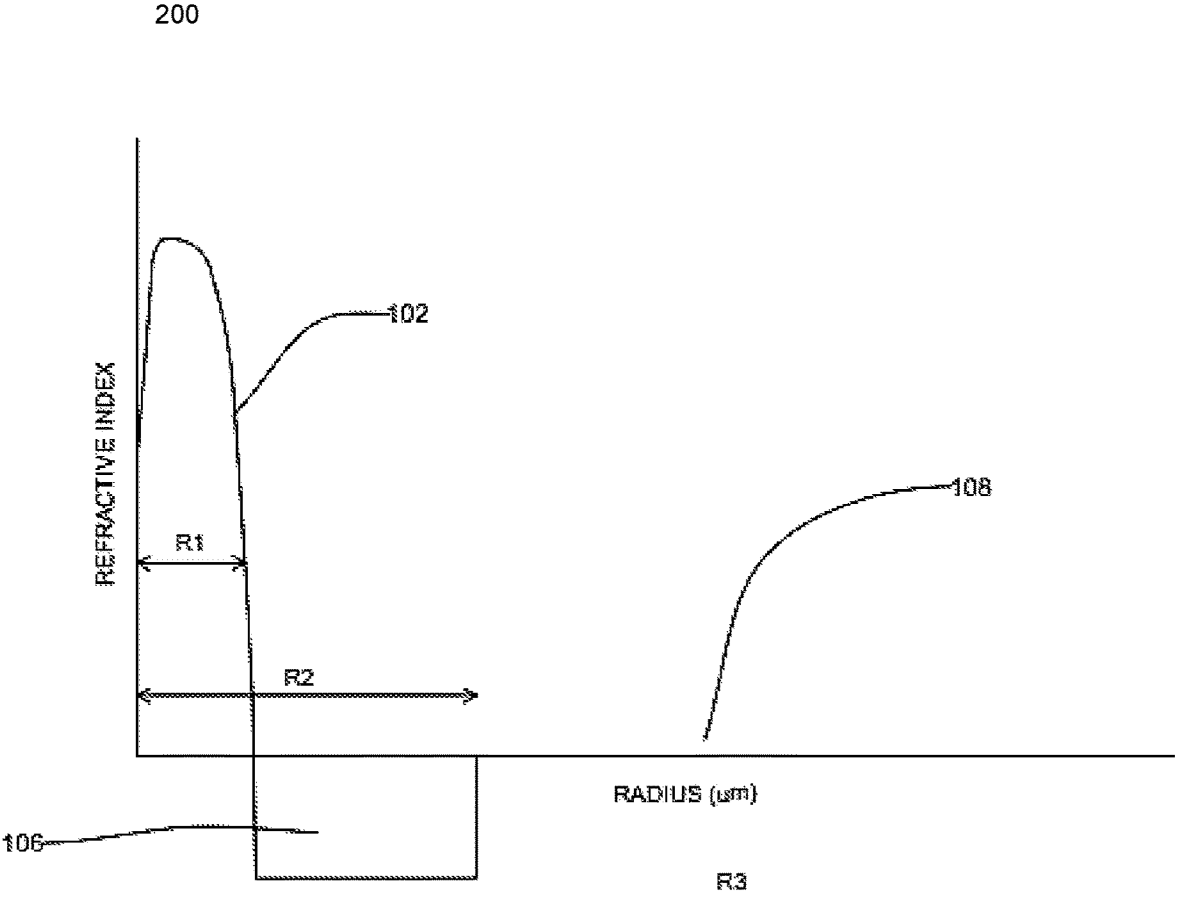
FIG. 2 is a snapshot illustrating a refractive index profile of the optical fiber in accordance with one embodiment of the present invention.
Figure 3:
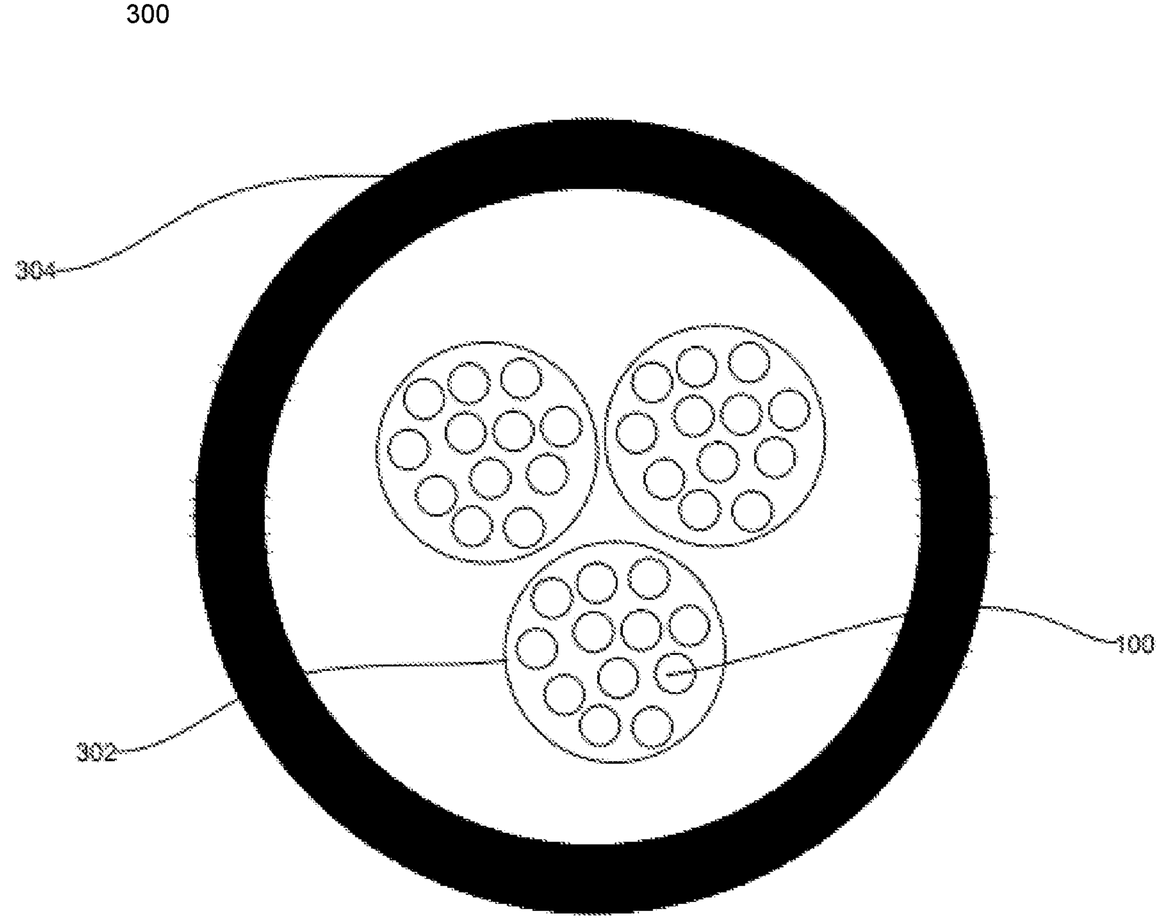
FIG. 3 is a snapshot illustrating a cross-sectional view illustrating a cable having the optical fiber in accordance with one embodiment of the present invention.

The principles of the present invention and their advantages are best understood by referring to FIG. 1 to FIG. 3. In the following detailed description, numerous specific details are set forth in order to provide a thorough understanding of the embodiment of the invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practised with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list. References within the specification to “one embodiment,” “an embodiment,” “embodiments,” or “one or more embodiments” are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

Intermittently bonded ribbon cables include intermittently bonded ribbons inside a core of the intermittently bonded ribbon cables. In particular, the intermittently bonded ribbon corresponds to an optical fiber ribbon with a plurality of optical fibers joined at intermittent locations along a longitudinal length of the intermittently bonded ribbon. Moreover, the intermittent bonding enables the optical fiber ribbon to be flexible and rollable. It also enables high density of optical fibers inside the intermittent bonded ribbon cable.

A core of an optical fiber is made of silica glass in which a dopant such as germanium, phosphorus and the like is introduced for raising refractive index of the core.

The refractive index is the speed of light in a vacuum divided by the speed of light in a material. Particularly, the refractive index measures how much a material refracts light.

Cladding is defined as one or more layers of materials of lower refractive index, in contact with a core material of higher refractive index.

The term "trench delta" as used herein is referred to as a measure of the relative difference in refractive index between trench region and pure silica region. As used herein, the trench delta is represented by Δ_trench and its values are given in units of "%", unless otherwise specified.

The trench delta is represented by $$\frac{\left((ntrench)^2 - (nsilica)^2\right) * (100\%)}{2ntrench^2},$$

where ntrench is the refractive index of trench region and nsilica is refractive index of pure silica.

The term "core delta" as used herein is referred to as a measure of the relative difference in refractive index between core region and pure silica region. As used herein, the core delta is represented by Δ_core and its values are given in units of "%", unless otherwise specified. The core delta is represented by $$\frac{\left((ncore)^2 - (nsilica)^2\right) * (100\%)}{2ncore^2},$$

where ncore is the refractive index of core region and nsilica is refractive index of pure silica.

Mode Field Diameter in an optical fiber is a measure of the width of an irradiance distribution, that is, the optical power per unit area, across an end of a single-mode fiber. In particular, the mode field diameter (MFD) of the optical fiber 100 is a section of fiber where most of the light energy travels. Moreover, the Mode Field Diameter represents an effective diameter of the light mode propagating through the optical fiber. Furthermore, the Mode Field Diameter is analogous to a measurement of a beam diameter for a beam propagating in free space. A value of the Mode Field Diameter is twice a value of a mode field radius.

Micro-bending loss relates to the light signal loss associated with lateral stresses along the length of the optical fiber. In particular, the micro-bending loss is due to the coupling from the fiber's guided fundamental mode to lossy, higher-order radiation modes. Morever, mode coupling occurs when fibers suffer small random bends along a fiber axes. This random bending is usually caused by external mechanical stresses against the cable material that compress the optical fiber. The result is random, high-frequency perturbations to the optical fiber.

Macro-bending loss or attenuation of light signals due to macro-bending occurs when the optical fiber is bent into a visible curvature. In particular, a relatively large-radius bend in an optical fiber may be found in a splice organizer tray or a fiber-optic cable that has been bent. Moreover, macro-bends may be caused by incorrect installation and are commonly found at fiber organizers and patch cables. Furthermore, environmental changes may lead to the macro-bending loss. Further, macro-bending loss also occurs when the optical fiber cable is subjected to a significant amount of bending above a critical value of curvature. The macro-bending losses are also called large radius losses. Optical fibers suffer radiation losses at bends or curves on their paths.

Refractive index dip is a difference between maximum refractive index and minimum refractive index.

Terms "trench radius R2" or "radius R2" are interchangeably used throughout the draft for convenience.

Terms "outermost sheath 304" and "sheath 304" are interchangeably used throughout the draft for convenience.

Referring to FIG. 1 illustrates a cross-sectional view of an optical fiber 100 in accordance with one embodiment of the present invention. The optical fiber 100 comprises a core region 102 and a cladding region 104. In particular, the optical fiber 100 is defined by a central longitudinal axis 110 passing through a center of the optical fiber 100. Moreover, the optical fiber 100 may be used in ribbon cables.

Furthermore, the optical fiber 100 is manufactured using one of a plurality of manufacturing methods including, but not limited to an Outside Vapor Phase Oxidation (OVPO) method, a Modified Chemical Vapor Deposition (MCVD) method, a Vapor-phase Axial Deposition (VAD) method and the like.

Further, the optical fiber 100 is used for transmitting information as light pulses from one end to another. The optical fiber 100 is a thin strand of glass or plastic capable of transmitting optical signals. Further, it is configured to transmit large amounts of information over long distances with relatively low attenuation. The intensity of the light beam reduces (or signal) with respect to distance travelled through a transmission medium. Additionally, the optical fiber 100 is utilized for data transmission. And, the optical fiber 100 is a single mode optical fiber configured for transmission of single mode of light.

In accordance with an embodiment of the present invention, the core region 102 of the optical fiber 100 has a radius R1. The core region 102 is defined from a center of the optical fiber 100 to an outer periphery of the core region 102 of the optical fiber 100. In particular, the light travels through the core region 102.

In an embodiment, the core region 102 is an up-doped silica region.

In another embodiment, the radius R1 of the core region 102 is about 5.1 microns. Alternatively, the radius R1 of the core region 102 is in a range of 4.5 microns to 5.6 microns. Moreover, the radius R1 of the core region 102 may vary. Furthermore, the core region 102 is defined by a refractive index value.

Furthermore, the core region 102 has a refractive index Δ_core. The core region 102 has percentage change in refractive index factor denominated as Δ_core (%).

In one embodiment, a minimum working value of Δ_core (%) maybe 0.3 and a maximum working value of Δ_core (%) maybe 0.4. Alternatively, the value of Δ_core (%) maybe 0.31. Furthermore, the core region 102 is defined by a curve parameter core alpha.

In an embodiment of the present invention, the curve parameter core alpha is in a range of 2.5 to 5.0. Alternatively, the curve parameter core alpha is 5.0. Moreover, the value of the curve parameter core alpha may vary.

In accordance with an embodiment of the present invention, the optical fiber 100 comprises the cladding region 104. The cladding region 104 has a radius R3.

In one embodiment, the cladding region 104 further comprises an inner clad region 106 and an outer clad region 108. In particular, the outer clad region 108 surrounds the inner clad region 106. The inner clad region 106 is defined by an inner clad refractive index profile. Moreover, the outer clad region 108 is defined by an outer clad refractive index profile.

In an embodiment, the inner clad refractive index profile is different from the outer clad refractive index profile. Alternatively, the cladding region 104 has a total radius of R2+R3 when the inner clad region 106 is present.

In another embodiment, the inner clad region 106 is down-doped silica region. The inner clad region 106 is adjacent to the core region 102 such that there is no buffer region between the core region 102 and the inner clad region 106.

In yet another embodiment of the present invention, the inner clad region 106 is a trench region. The trench region or the inner clad region 106 is formed by down doping the cladding region 104 up to the radius R2.

In yet another embodiment, the inner clad region 106 is defined by one or more of the trench delta in a range of −0.05 to −0.2, a trench radius R2 between 14 microns to 16.5 microns and the trench alpha between 6 and 9.

In accordance with an embodiment of the present invention, the outer clad region 108 is un-doped silica region. The outer clad region 108 is made of pure silica without any doping. Moreover, the outer clad region 108 has a percentage change in refractive index value of zero.

Further, the inner clad region 106 concentrically surrounds the core region 102. The inner clad region 106 is defined by the radius R2 from the center of the optical fiber 100 to an outer periphery of the inner clad region 106 of the optical fiber 100.

In one embodiment, the radius R2 of the inner clad region 106 is about 14 microns to 16.5 microns. Alternatively, the radius R2 of the inner clad region 106 is 16.2 microns. Moreover, the radius R2 of the inner clad region 106 may vary.

Further, the inner clad region 106 has a percentage change in refractive index factor denominated as Δ_trench (%).

In an embodiment, a minimum working value of Δ_trench (%) maybe −0.05. In particular, a maximum working value of Δ_trench (%) maybe −0.2. Alternatively, the value of Δ_trench (%) of the inner clad region 106 is −0.08. Moreover, the value of Δ_trench (%) of the inner clad region 106 may vary.

Additionally, the inner clad region 106 is defined by a curve parameter trench alpha.

In an embodiment of the present invention, the trench alpha of the inner clad region 106 is in a range of 6.0 to 9.0. Alternatively, the trench alpha of the inner clad region 106 is about 9.0. Moreover, the value of the trench alpha of the inner clad region 106 may vary.

In yet another embodiment of the present invention, the core alpha of the core region 102 is less than the trench alpha of the inner clad region 106 or the trench region. The core alpha of the core region 102 is less because fluorine doping of glass reduces zero dispersion wavelength towards a lower value. Hence, a low value of the core alpha of the core region 102 ensures that the zero dispersion wavelength is in a desired range. Moreover, the low value of the core alpha of the core region 102 helps to get good confinement of light.

The trench alpha of the inner clad region 106 is driven by low temperature doping of fluorine which always gives a high alpha trench region.

In yet another embodiment, if the value of the trench delta of the inner clad region 106 is decreased or the value of the core delta of the core region 102 is increased, the Mode Field Diameter reduces. Particularly, the inner clad region 106 that is immediate to the core region 102 helps in getting good confinement of the light signal inside the core region 102 of the optical fibre 100. This helps in achieving the required or expected Micro-bend performance relatively as compared to an optical fibre with a buffer layer in between and with similar doping levels of a trench region.

In accordance with an embodiment of the present invention, the optical fiber 100 comprises the outer clad region 108.

In an embodiment, the outer clad region 108 concentrically surrounds the inner clad region 106. In particular, the outer clad region 108 is made of pure silica. Moreover, the outer clad region 108 may be doped with a down dopant such as fluorine for lowering the refractive index of the outer clad region 108.

Moreover, the outer cladding region 108 is defined by a radius R3 from the center of the optical fiber 100 to an outer periphery of the outer clad region 108 of the optical fiber 100.

In one embodiment of the present invention, the radius R3 of the outer clad region 108 is in a range of 62 microns to 63 microns. Alternatively, the radius R3 of the outer clad region 108 is 62.5 microns. The outer clad region 108 causes light to be confined to the core region 102 of the optical fiber 100 by total internal reflection at a boundary between the two regions.

FIG. 2 is a refractive index profile 200 of the optical fiber 100 in accordance with one embodiment of the present invention. The refractive index profile 200 is a graph illustrating a change in refractive index from the central longitudinal axis 110 to an outermost periphery of the optical fiber 100. In particular, the refractive index profile 200 illustrates the change in refractive index from the core region 102 to the cladding region 104. Moreover, the graph of the refractive index profile 200 is plotted between a radius of the optical fiber 100 and the refractive index of the optical fiber 100.

In accordance with an embodiment of the present invention, the refractive index delta of the core region 102 initially increases and then decreases sharply from the center of the optical fiber 100 towards the outer periphery of the core region 102 to come down to absolute zero.

In an embodiment, the refractive index delta of the inner clad region 106 having the radius R2 is negative. In particular, the value of the refractive index delta of the inner clad region 106 is negative.

In another embodiment, the inner clad region 106 is the trench region formed by down doping the cladding region 104 till the radius R2. Alternatively, the value of the refractive index delta for the outer clad region 108 is zero throughout, as it is formed by pure silica.

In accordance with an embodiment of the present invention, the optical fiber 100 may be used to form intermittently bonded ribbon or IBR. In particular, the value of parameters Mode Field Diameter or MFD, Micro-bending loss and Macro-bending loss of the optical fiber 100 is optimized and altered during the manufacturing stage. Moreover, the optical fiber 100 has the Mode Field Diameter in a range of 8.5+/−0.3 microns at a wavelength of 1310 nanometers.

In one embodiment, the Mode Field Diameter of the optical fiber 100 may vary. The Mode Field Diameter for the optical fiber 100 is low as compared to Mode Field Diameter of other fibers. The low Mode Field Diameter in combination with the inner clad region 106 makes it possible for the intermittently bonded ribbon cable to provide expected performance.

In accordance with an embodiment of the present invention, the optical fiber 100 suffers attenuation or loss of optical power as light travels through the core.

In one embodiment, the attenuation is due to bending. In particular, the optical fiber 100 has stringent micro-bending properties enabling the optical fiber 100 to be used in the intermittently bonded ribbon cables.

The optical fiber 100 has the micro-bending loss of less than equal to 0.5 dB/Km at a wavelength of 1550 nanometers. Particularly, the inner clad region 106 immediate to the core region 102 helps in getting good confinement of the light signal in the core region 102 of the optical fiber 100 that helps in achieving the desired micro-bend performance. The complex intermittently bonded ribbon cables require stringent micro-bend performance of the optical fiber to be used. The micro-bending loss of less than equal to 0.5 dB/Km at a wavelength of 1550 nanometers helps in achieving the stringent micro-bend performance of the optical fiber 100.

In an embodiment, the micro-bending loss measurement is done at 250 grams winding tension in drum method. The measurements are made using a proprietary measurement method using an apparatus consisting of a fixed diameter drum. In order to avoid macro-bending effects, the drum of 200 mm diameter is used. Moreover, the surface of the drum is coated with a material of fixed roughness. In an exemplary example, sandpaper-grade 40 is used for coating the surface of the drum. Furthermore, the optical fiber 100 having a length of 400 meters is wounded on the drum with 250 grams winding tension for measuring change in attenuation.

In another embodiment, the optical fiber 100 has stringent macro-bending properties enabling the optical fiber 100 to be used in intermittently bonded ribbon cables. The optical fiber 100 experiences the macro-bending loss.

In accordance with an embodiment of the present invention, the optical fiber 100 has the macro-bending loss of less than 1 dB/Km at a wavelength 1550 nanometers. The complex intermittently bonded ribbon cables require stringent macro-bend performance of the optical fiber to be used and the macro-bending loss of less than 1 dB/Km at a wavelength 1550 nanometers helps in achieving the stringent macro-bend performance of the optical fiber 100.

In one embodiment, the macro-bending loss measurement is done at 15 millimeters mandrel diameter. The measurements are made using a proprietary measurement method. In particular, the measuring apparatus consists of an optical fiber wrapped around the mandrel having 15 millimeters diameter to measure the macro-bending loss.

In accordance with an embodiment of the present invention, the optical fiber 100 is defined by a delta ratio. In particular, the delta ratio is a ratio of absolute values of the trench delta of the inner clad region 106 to absolute values of the core delta of the core region 102. Moreover, the delta ratio is between 0.12 to 0.67.

In accordance with an embodiment of the present invention, the optical fiber 100 is defined by a refractive index dip. In particular, an absolute value of the difference between the maximum refractive index and the minimum refractive index is between 0.005 to 0.009.

In one embodiment, the optical fiber 100 has a diameter of less than 210 microns. Alternatively, the optical fiber 100 may have a diameter of about 250 microns with coating.

FIG. 3 is a cross-sectional view illustrating a cable 300 having the optical fiber 100 in accordance with one embodiment of the present invention. The cable 300 comprises a plurality of optical fiber bundles 302 and a sheath 304. In particular, the cable 300 is defined by a cable filling coefficient. The cable filling coefficient is defined as total cross-sectional area of fiber divided by an inner cross section area of the cable 300. Moreover, the outermost sheath of the cable 300 defines the inner cross section area of the cable 300.

In an embodiment, the cable filling coefficient is in a range of 25-40% when the optical fiber 100 has a diameter in a range of 250+−15 microns. Alternatively, the cable filling coefficient is in a range of 35-55% when the optical fiber 100 has a diameter in a range of 200+−15 microns.

In yet another embodiment, the cable filling coefficient is greater than 50% when the optical fiber 100 has a diameter of less than 185 microns.

Furthermore, each of the plurality of optical fiber bundles 302 comprises a plurality of optical fibers. Each of the plurality of optical fibers corresponds to the optical fiber 100.

In an embodiment, number of the plurality of optical fibers in each of the plurality of optical fiber bundles 302 is 12. Alternatively, there may be any number of optical fibers in each of the plurality of optical fiber bundles 302.

In another embodiment, number of the plurality of optical fiber bundles 302 in the cable 300 is 3. Alternatively, there may be any number of the plurality of optical fiber bundles 302 in the cable 300.

In yet another embodiment, the cable 300 may have more layers or elements such as water blocking yarns, buffer tubes and the like. In particular, these layers may surround the plurality of optical fiber bundles 302.

The present invention of a single mode optical fiber 100 for use in Intermittently Bonded Ribbon cables provides a number of advantages. The present invention provides an optical fiber 100 with a modified design. Moreover, the optical fiber 100 of the present invention has a different refractive index profile. Furthermore, the present invention provides the optical fiber 100 with optimized values of characteristics such as macro-bending loss, micro-bending loss and Mode Field Diameter which is required for specific cable types.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

We claim:

1. An optical fiber (100) comprising:

a core region (102), wherein the core region (102) has a radius R1, wherein the core region (102) is defined along a central longitudinal axis (110) of the optical fiber (100); and a cladding region (104) having a radius R3, wherein the cladding region (104) is defined along the central longitudinal axis (110) of the optical fiber (100), wherein the cladding region (104) comprising an inner clad region (106) defined by an inner clad refractive index profile, wherein inner clad refractive index profile is an alpha profile, wherein the inner clad region (106) is a trench region defined by one or more of trench delta in a range of −0.05 to −0.2, wherein the trench region defined by a trench radius R2 between 14 microns to 16.5 microns and trench alpha between 6 and 9;

wherein the optical fiber (100) has a Mode Field Diameter in a range of 8.5+/−0.3 microns at a wavelength of 1310 nanometers, a micro-bending loss of less than equal to 0.5 dB/Km at a wavelength of 1550 nanometers and a macro-bending loss of less than 1 dB/turn at a wavelength 1550 nanometers and a bend diameter of 15 millimeters.

2. The optical fiber (100) as claimed in claim 1, wherein the cladding region (104) further comprising: an outer clad region (108) surrounding the inner clad region (106), wherein the outer clad region (108) is defined by an outer clad refractive index profile, wherein the inner clad refractive index profile is different from the outer clad refractive index profile.

3. The optical fiber (100) as claimed in claim 1, wherein the inner clad region (106) is down-doped silica region adjacent to the core region (102) such that there is no buffer region between the core region (102) and the inner clad region (106).

4. The optical fiber (100) as claimed in claim 1, wherein the core region (102) is defined by a core alpha, wherein the core alpha of the core region (102) is less than the trench alpha of the trench region.

5. The optical fiber (100) as claimed in claim 2, wherein the outer clad region (108) is un-doped silica region.

6. The optical fiber (100) as claimed in claim 1, wherein the core region (102) is up-doped silica region.

7. The optical fiber (100) as claimed in claim 1, wherein the optical fiber (100) is defined by a refractive index dip, and the refractive index dip is a difference between maximum refractive index and minimum refractive index.

8. The optical fiber (100) as claimed in claim 1, wherein an absolute value of the difference between the maximum refractive index and the minimum refractive index is between 0.005 to 0.009.

9. The optical fiber (100) as claimed in claim 1, wherein the optical fiber (100) is defined by a delta ratio, and the delta ratio is a ratio of absolute values of a trench delta of a trench region to absolute values of a core delta of the core region (102) wherein the delta ratio is between 0.12 to 0.67.

10. The optical fiber (100) as claimed in claim 1, wherein the optical fiber (100) has a diameter of less than 210 microns.

11. The optical fiber (100) as claimed in claim 1, wherein the optical fiber (100) is used in a cable (300) such that a cable filling coefficient is in a range of 25-40% when the optical fiber (100) has a diameter in a range of 250+−15 microns.

12. The optical fiber (100) as claimed in claim 11, wherein the cable filling coefficient is in a range of 35-55% when the optical fiber (100) has a diameter in a range of 200+−15 microns.

13. The optical fiber (100) as claimed in claim 11, wherein the cable filling coefficient is greater than 50% when the optical fiber (100) has a diameter of less than 185 microns.

14. The optical fiber (100) as claimed in claim 1, wherein a cable filling coefficient is defined as total cross sectional area of fiber divided by an inner cross section area of the cable (300) and wherein the inner cross section area of the cable is defined by an outermost sheath of the cable (300).

15. The optical fiber (100) as claimed in claim 1, wherein the optical fiber (100) is manufactured using any of an Outside Vapor Phase Oxidation (OVPO) method, a Modified Chemical Vapor Deposition (MCVD) method, a Vapor-phase Axial Deposition (VAD) method.

16. The optical fiber (100) as claimed in claim 1, wherein the radius R1 of the core region (102) is in a range of 4.5 microns to 5.6 microns.

17. The optical fiber (100) as claimed in claim 1, wherein the core region (102) has a curve parameter core alpha in a range of 2.5 to 5.0.

18. The optical fiber (100) as claimed in claim 1, wherein the outer clad region 108 has radius R3 in a range of 62 microns to 63 microns.

* * * * *